US011902167B2

(12) United States Patent
Fukui et al.

(10) Patent No.: US 11,902,167 B2
(45) Date of Patent: Feb. 13, 2024

(54) COMMUNICATION APPARATUS HAVING DELAY GUARANTEE SHAPING FUNCTION

(71) Applicant: NIPPON TELEGRAPH AND TELEPHONE CORPORATION, Tokyo (JP)

(72) Inventors: Tatsuya Fukui, Musashino (JP); Katsuya Minami, Musashino (JP); Yuki Sakaue, Musashino (JP); Hiroyuki Furukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 109 days.

(21) Appl. No.: 17/624,464

(22) PCT Filed: Jul. 4, 2019

(86) PCT No.: PCT/JP2019/026743
§ 371 (c)(1),
(2) Date: Jan. 3, 2022

(87) PCT Pub. No.: WO2021/002022
PCT Pub. Date: Jan. 7, 2021

(65) Prior Publication Data
US 2022/0360534 A1      Nov. 10, 2022

(51) Int. Cl.
*H04L 47/215* (2022.01)
*H04L 47/52* (2022.01)
(Continued)

(52) U.S. Cl.
CPC .......... *H04L 47/215* (2013.01); *H04L 47/528* (2013.01); *H04L 47/56* (2013.01); *H04L 47/58* (2013.01)

(58) Field of Classification Search
CPC ..................................................... H04L 47/215
See application file for complete search history.

(56) References Cited

U.S. PATENT DOCUMENTS

| | | | | |
|---|---|---|---|---|
| 7,830,796 B2* | 11/2010 | Chen | ..................... | H04L 47/215 370/230.1 |
| 7,948,882 B2* | 5/2011 | Chin | ...................... | H04L 47/21 370/230 |

(Continued)

FOREIGN PATENT DOCUMENTS

JP          2018148453 A      9/2018

*Primary Examiner* — Guang W Li
(74) *Attorney, Agent, or Firm* — Harness, Dickey & Pierce, P.L.C.

(57) ABSTRACT

An object is to provide a communication apparatus, a communication method, and a program capable of avoiding an increase in network load when input traffic continues to be large and a communication delay when input traffic is very small. A communication apparatus according to the present invention prepares three token buckets and can transfer, discard, or hold a packet in accordance with the amount of tokens in each token bucket. This enables the communication apparatus to operate so as not to exceed a set maximum bandwidth when large traffic is received for the delay guarantee shaping. Further, When the maximum bandwidth is exceeded, the communication apparatus can select whether to discard a packet to prioritize a delay guarantee or to hold a packet to prioritize no loss of packets. Furthermore, the communication apparatus can immediately transmit a packet without increasing a communication delay when input traffic is very small.

4 Claims, 19 Drawing Sheets

(A)

(B)

(51) Int. Cl.
  *H04L 47/56* (2022.01)
  *H04L 47/50* (2022.01)

(56) References Cited

U.S. PATENT DOCUMENTS

| | | | | |
|---|---|---|---|---|
| 8,032,653 | B1* | 10/2011 | Liu | H04L 47/22 709/235 |
| 8,050,284 | B2* | 11/2011 | Zhao | H04L 47/43 370/395.7 |
| 8,320,240 | B2* | 11/2012 | Kwan | H04L 47/6255 370/395.42 |
| 10,432,429 | B1* | 10/2019 | Matthews | H04L 69/28 |
| 2004/0117502 | A1* | 6/2004 | Rosengard | H04L 49/9023 709/236 |
| 2006/0187825 | A1* | 8/2006 | Andersen | H04L 47/50 370/412 |
| 2007/0195778 | A1* | 8/2007 | Tatar | H04L 49/1546 370/469 |
| 2008/0225743 | A1* | 9/2008 | Damnjanovic | H04L 47/215 370/252 |
| 2011/0038261 | A1* | 2/2011 | Carlstrom | H04L 47/6275 370/230 |
| 2012/0294317 | A1* | 11/2012 | Livne | H04L 47/6215 370/462 |
| 2014/0281000 | A1* | 9/2014 | Dattagupta | H04L 47/11 709/231 |
| 2016/0212065 | A1* | 7/2016 | To | H04L 47/525 |
| 2016/0259569 | A1* | 9/2016 | Povzner | G06F 13/102 |
| 2019/0007338 | A1* | 1/2019 | To | H04L 47/783 |
| 2019/0356605 | A1* | 11/2019 | Tanisho | H04L 41/40 |
| 2022/0360534 | A1* | 11/2022 | Fukui | H04L 47/528 |

\* cited by examiner

Fig. 3

DELAY PARAMETER TABLE

| ITEM | VALUE |
|---|---|
| REQUESTED DELAY TIME Dd[ms] | 15 |
| NETWORK DELAY Dr[ms] | 5 |
| TOKEN SUPPLY CYCLE Tc[ms] | 1 |
| TOKEN SUPPLY FUNCTION UPDATE CYCLE Tu[ms] | 1 |
| TOKEN SUPPLY FUNCTION REFLECTION CYCLE Tr[ms] | 1 |

Fig. 5

BANDWIDTH PARAMETER TABLE

| ITEM | VALUE |
|---|---|
| MINIMUM BANDWIDTH [Mbps] | 1 |
| MINIMUM BANDWIDTH BURST [Bytes] | 2000 |
| MAXIMUM BANDWIDTH [Mbps] | 48 |
| MAXIMUM BANDWIDTH BURST [Bytes] | 6000 |
| OPERATION WHEN EXCEEDING MAXIMUM BANDWIDTH | DISCARD |

Fig. 8

DELAY PARAMETER TABLE

| ITEM | VALUE |
|---|---|
| REQUESTED DELAY TIME Dd[ms] | 15 |
| NETWORK DELAY Dr[ms] | 5 |
| TOKEN SUPPLY CYCLE Tc[ms] | 1 |
| TOKEN SUPPLY FUNCTION UPDATE CYCLE Tu[ms] | 1 |
| TOKEN SUPPLY FUNCTION REFLECTION CYCLE Tr[ms] | 1 |

Fig. 9

BANDWIDTH PARAMETER TABLE

| ITEM | VALUE |
|---|---|
| MINIMUM BANDWIDTH [Mbps] | 1 |
| MINIMUM BANDWIDTH BURST [Bytes] | 2000 |
| MAXIMUM BANDWIDTH [Mbps] | 48 |
| MAXIMUM BANDWIDTH BURST [Bytes] | 6000 |
| OPERATION WHEN EXCEEDING MAXIMUM BANDWIDTH | NOT TO DISCARD |

COMMUNICATION APPARATUS HAVING DELAY GUARANTEE SHAPING FUNCTION

CROSS-REFERENCE TO RELATED APPLICATIONS

This application is a 371 U.S. National Phase of International Application No. PCT/JP2019/026743 filed on Jul. 4, 2019. The entire disclosure of the above application is incorporated herein by reference.

TECHNICAL FIELD

The present disclosure relates to a communication apparatus having a delay guarantee shaping function, a communication method thereof, and a program for realizing the communication method.

BACKGROUND ART

Recent years have seen a rapid proliferation of a wide variety of applications and services such as IoT (Internet of Things)/M2M (Machine-to-Machine), 4K/8K high-definition video distribution service, and online games in addition to IP data communication. In particular, there has been a rapid proliferation of IoT, which performs automatic recognition, automatic control, remote measurement, etc. by providing not only information/communication devices such as computers but also various "things" that exist in the world with communication functions to communicate with each other.

As an example of IoT, there is considered a communication scenario in which a predetermined physical quantity (current, voltage, atmospheric pressure, air temperature, water amount, humidity, etc.) is acquired in a remote value, and the above data is collected on the center side to perform a big data analysis, and based on the analysis result, the operation of a machine is automatically controlled. To accurately collect data and perform remote control operations, it is very important that the communication is to be completed correctly within a predetermined time. For example, for a system that performs data collection and remote control operations based on the collected data within 50 ms, a one-way communication delay needs to be controlled within 25 ms at most.

However, large fluctuations occur in communication delay between two points in the current best effort communication services. Specifically, when the communication environment is good, a communication delay that occurs in packet transfer between two points is almost equal to the shortest communication delay (the ideal value of a delay time that does not include a delay caused by a variable factor such as congestion) that occurs due to a communication path length, device switching processing, etc., whereas, when the communication environment is poor, a very large communication delay at a level of several hundred ms occurs, and a packet loss sometimes occurs. It cannot be said that such a communication service is suitable for the above-described communication scenario in IoT. Therefore, inexpensively implementing a communication delay guarantee service in which communication delay occurring in packet transfer between two points is reduced to within a certain time has been awaited.

As one of the services that provide highly reliable and low-delay communication, PTL 1 discloses a delay guarantee shaping function. The delay guarantee shaping function in PTL 1 changes the shaping bandwidth based on the shortest communication delay and the communication delay to be guaranteed when a packet is transferred between two points. This can provide the user with the communication delay guarantee while reducing the communication network load.

CITATION LIST

Patent Literature

[PTL 1] Japanese Patent Application Publication No. 2018-148453

SUMMARY OF THE INVENTION

Technical Problem

FIG. 1 is a diagram illustrating a delay guarantee shaping function described in PTL 1. In FIG. 1, the horizontal axis is time, the vertical axis is the packet transmission amount, the bar graph indicates the input packet amounts, and the line graph indicates the output packet amounts. The delay guarantee shaping function described in PTL 1 is an operation of increasing the communication bandwidth each time a packet is received. Thus, when the input traffic continues to be large due to an abnormality of a device, a user error, or the like, the communication bandwidth increases endlessly as illustrated in FIG. 1(A), and this causes a strain on the communication network. In addition, when the input traffic is very small, although the effect of reducing the communication network load by the delay guarantee shaping function is small, the packet communication delay may increase as illustrated in FIG. 1(B). That is, the delay guarantee shaping function described in PTL 1 has difficulties in avoiding an increase in network load when the input traffic continues to be large and a communication delay when the input traffic is very small.

Therefore, to solve the above issue, it is an object of the present invention to provide a communication apparatus, a communication method, and a program capable of avoiding an increase in network load when input traffic continues to be large and a communication delay when input traffic is very small.

Means for Solving the Problem

To achieve the above object, a communication apparatus according to the present invention includes three token buckets of a minimum bandwidth guarantee token bucket, a maximum bandwidth guarantee token bucket, and a delay guarantee token bucket for the delay guarantee shaping and determines packet processing in accordance with the states of these three token buckets and an operation setting set for a case where the maximum bandwidth is exceeded.

Specifically, the communication apparatus according to the present invention includes: a queue that temporarily holds a packet received from a user device; three token buckets of a delay guarantee token bucket, a minimum bandwidth token bucket, and a maximum bandwidth token bucket; a transmission determination function unit that has a token bucket algorithm which transfers a packet held in the queue to a communication network in accordance with tokens held in the three token buckets; a metering unit that measures an amount of packets received from the user device at predetermined intervals; a token supply calculation unit that has a token supply function which specifies an amount of tokens to be supplied to the delay guarantee token bucket and a supply period at the predetermined intervals, generates the token supply function to be added based on the amount of packets measured by the metering unit, and adds the token supply function to be added to the previous token supply function; a delay guarantee token supply unit that supplies the delay guarantee token bucket with an amount of tokens corresponding to the token supply function set by the token supply calculation unit at the predetermined intervals; a minimum bandwidth token supply unit that supplies the minimum bandwidth token bucket with an amount of tokens based on a preset minimum bandwidth at the predetermined intervals; and a minimum bandwidth token supply unit that supplies the maximum bandwidth token bucket with an amount of tokens based on a preset maximum bandwidth at the predetermined intervals.

In addition, a communication method according to the present invention includes: holding a packet received from a user device in a queue temporarily; and performing processing when a packet held in the queue is transferred to a communication network by using a token bucket algorithm which outputs a packet in accordance with tokens held in three token buckets of a delay guarantee token bucket, a minimum bandwidth token bucket, and a maximum bandwidth token bucket, wherein the processing includes: measuring an amount of packets received from the user device at predetermined intervals; generating a token supply function, which specifies an amount of tokens to be supplied to the delay guarantee token bucket and a supply period at the predetermined intervals, by generating the token supply function to be added based on the measured amount of packets and adding the token supply function to be added to the previous token supply function; supplying the delay guarantee token bucket with an amount of tokens corresponding to the generated token supply function at the predetermined intervals; supplying the minimum bandwidth token bucket with an amount of tokens based on a preset minimum bandwidth at the predetermined intervals; and supplying the maximum bandwidth token bucket with an amount of tokens based on a preset maximum bandwidth at the predetermined intervals.

The communication apparatus according to the present invention prepares three token buckets and can transfer, discard, or hold a packet in accordance with the amount of tokens in each token bucket. This enables the present communication apparatus to operate so as not to exceed a set maximum bandwidth when large traffic is received for the delay guarantee shaping. Further, when the maximum bandwidth is exceeded, the present communication apparatus can select whether to discard a packet to prioritize a delay guarantee or to hold a packet to prioritize no loss of packets. Furthermore, the present communication apparatus can immediately transmit a packet without increasing a communication delay when input traffic is very small.

Thus, the present invention can provide a communication apparatus and a communication method capable of avoiding an increase in network load when input traffic continues to be large and a communication delay when input traffic is very small.

Assuming that a total amount of tokens held in the minimum bandwidth token bucket is Tmin, a total amount of tokens held in the maximum bandwidth token bucket is Tmax, a total amount of tokens held in the delay guarantee token bucket is Td, and a packet size of a first packet in the queue is B at any given time point, after a token supply time at which tokens are supplied to the three token buckets, the token bucket algorithm of the communication apparatus according to the present invention transfers a first packet of the queue to the communication network and subtracts B from each of Tmin, Td, and Tmax, when Tmin−B is larger than zero and when Tmin−B is zero or less and Td−B and Tmax−B are larger than zero; holds the first packet of the queue on standby in the queue until the next token supply time, when Tmin−B and Td−B are zero or less; and holds the first packet of the queue on standby in the queue until the next token supply time or discards the first packet of the queue and subtracts B from Td depending on a setting in other cases.

In addition, assuming that an execution time point of the current token supply calculation is t_now, the previous token supply function is now_Ts(t), and a sum of the amounts of packets measured by the metering unit during a period from an execution time point of the last token supply calculation to an execution time point of the current token supply calculation is Bm, and as described in the delay parameter table, a token supply cycle is Tc, a token supply function update cycle is Tu, a token supply function reflection cycle is Tr, a requested delay time interval of the packet is Dd, and a delay time interval in the communication network to transfer the packet to a transfer destination is Dr, the token supply calculation unit in the communication apparatus according to the present invention calculates the token supply function to be added add_Ts(t), which is generated by executing the current token supply calculation, by using an equation C1 and calculates the new token supply function new_Ts(t) by adding the token supply function add_Ts(t) to the previous token supply function using an equation C2.

When $t$ is $t\_now+Tr$ or more and less than $t\_now+Tr+Da$: add_$Ts(t)=(Bm/Da) \times Tc$     [Equation C1]

When $t$ is less than $t\_now+Tr$ or $t\_now+Tr+Da$ or more: add_$Ts(t)=0$

However, $Da=Dd-Dr-Tu-Tr$ new_$Ts(t)=$now_$Ts(t)+$add_$Ts(t)$     [Equation C2]

The following communication apparatus can avoid a communication delay when input traffic is very small.

A communication apparatus according to the present invention includes: a queue that temporarily holds a packet received from a user device and two token buckets of a delay guarantee token bucket and a minimum bandwidth token bucket; a transmission determination function unit that has a token bucket algorithm which transfers a packet held in the queue to a communication network in accordance with tokens held in the two token buckets; a metering unit that measures an amount of packets received from the user device at predetermined intervals; a token supply calculation unit that has a token supply function which specifies an amount of tokens to be supplied to the delay guarantee token bucket and a supply period at the predetermined intervals, generates the token supply function to be added based on the amount of packets measured by the metering unit, and adds the token supply function to be added to the previous token supply function; a delay guarantee token supply unit that supplies the delay guarantee token bucket with an amount of tokens corresponding to the token supply function set by the token supply calculation unit at the predetermined intervals; and a minimum bandwidth token supply unit that supplies the minimum bandwidth token bucket with an amount of tokens based on a preset minimum bandwidth at the predetermined intervals, wherein, assuming that a total amount of tokens held in the minimum bandwidth token bucket is Tmin, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue to the communication network and subtracts B from each of Tmin and Td, when Tmin−B is larger than zero and when Tmin−B is zero or less and Td−B is larger than zero; and holds the first packet of the queue on standby in the queue until the next token supply time, when Tmin−B and Td−B are zero or less.

A communication method of the communication apparatus includes: holding a packet received from a user device in a queue temporarily; and performing processing when a packet held in the queue is transferred to a communication network by using a token bucket algorithm which outputs a packet in accordance with tokens held in two token buckets of a delay guarantee token bucket and a minimum bandwidth token bucket, wherein the processing includes: measuring an amount of packets received from the user device at predetermined intervals; generating a token supply function, which specifies an amount of tokens to be supplied to the delay guarantee token bucket and a supply period at the predetermined intervals, by generating the token supply function to be added based on the measured amount of packets and adding the token supply function to be added to the previous token supply function; supplying the delay guarantee token bucket with an amount of tokens corresponding to the generated token supply function at the predetermined intervals; and supplying the minimum bandwidth token bucket with an amount of tokens based on a preset minimum bandwidth at the predetermined intervals.

In addition, the following communication apparatus can avoid an increase in network load when input traffic continues to be large.

A communication apparatus according to the present invention includes: a queue that temporarily holds a packet received from a user device and two token buckets of a delay guarantee token bucket and a maximum bandwidth token bucket; a transmission determination function unit that has a token bucket algorithm which transfers a packet held in the queue to a communication network in accordance with tokens held in the two token buckets; a metering unit that measures an amount of packets received from the user device at predetermined intervals; a token supply calculation unit that has a token supply function which specifies an amount of tokens to be supplied to the delay guarantee token bucket and a supply period at the predetermined intervals, generates the token supply function to be added based on the amount of packets measured by the metering unit, and adds the token supply function to be added to the previous token supply function; a delay guarantee token supply unit that supplies the delay guarantee token bucket with an amount of tokens corresponding to the token supply function set by the token supply calculation unit at the predetermined intervals; and a maximum bandwidth token supply unit that supplies the maximum bandwidth token bucket with an amount of tokens based on a preset maximum bandwidth at the predetermined intervals, wherein, assuming that a total amount of tokens held in the maximum bandwidth token bucket is Tmax, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue to the communication network and subtracts B from each of Td and Tmax, when Td−B and Tmax−B are larger than zero; and holds the first packet of the queue on standby in the queue until the next token supply time, when Td−B is zero or less or when Td−B is larger than zero and Tmax−B is zero or less.

Alternatively, after a token supply time at which tokens are supplied to the two token buckets, the token bucket algorithm may transfer the first packet of the queue to the communication network and subtract B from each of Td and Tmax, when Td−B and Tmax−B are larger than zero; hold the first packet of the queue on standby in the queue until the next token supply time, when Td−B is zero or less; and discard the first packet of the queue and subtract B from Td, when Td−B is larger than zero and Tmax−B is zero or less.

A communication method of the communication apparatus includes: holding a packet received from a user device in a queue temporarily; and performing processing when a packet held in the queue is transferred to a communication network by using a token bucket algorithm which outputs a packet in accordance with tokens held in two token buckets of a delay guarantee token bucket and a maximum bandwidth token bucket, wherein the processing includes: measuring an amount of packets received from the user device at predetermined intervals; generating a token supply function, which specifies an amount of tokens to be supplied to the delay guarantee token bucket and a supply period at the predetermined intervals, by generating the token supply function to be added based on the measured amount of packets and adding the token supply function to be added to the previous token supply function; supplying the delay guarantee token bucket with an amount of tokens corresponding to the generated token supply function at the predetermined intervals; and supplying the maximum bandwidth token bucket with an amount of tokens based on a preset maximum bandwidth at the predetermined intervals.

Further, the present invention is a program that causes a computer to function as the communication apparatus. A communication apparatus according to the present invention can also be achieved by a computer and a program, and the program can be recorded on a recording medium or provided through a network.

The above inventions can be combined to the extent possible.

Effects of the Invention

The present invention can provide a communication apparatus, a communication method, and a program capable of avoiding an increase in network load when input traffic continues to be large and a communication delay when input traffic is very small.

BRIEF DESCRIPTION OF DRAWINGS

FIG. 3 illustrates a delay parameter table included in the communication apparatus according to the present invention.

FIG. 5 illustrates a bandwidth parameter table included in the communication apparatus according to the present invention.

FIG. 8 illustrates a delay parameter table included in the communication apparatus according to the present invention.

FIG. 9 illustrates a bandwidth parameter table included in the communication apparatus according to the present invention.

DESCRIPTION OF EMBODIMENTS

Figure 1:
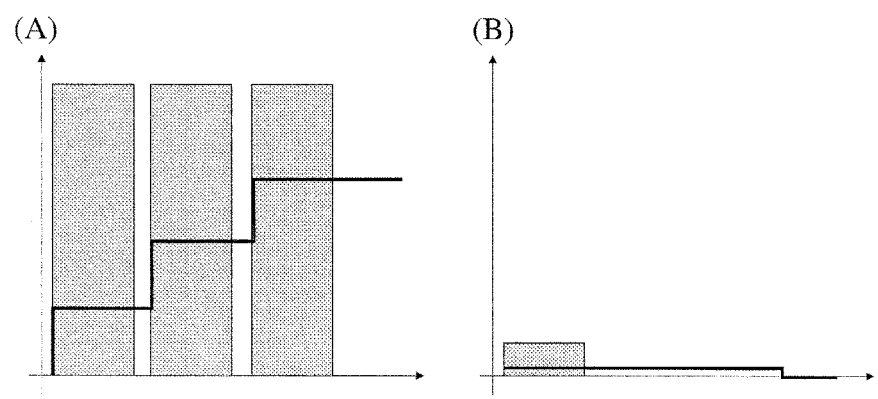
FIG. 1 is a diagram illustrating the problem to be solved by the present invention.

Embodiments of the present invention will be described with reference to the accompanying drawings. The embodiments described below are examples of the present invention, and the present invention is not limited to the following embodiments. In the present description and the drawings, like reference numerals denote like components.

Figure 2:
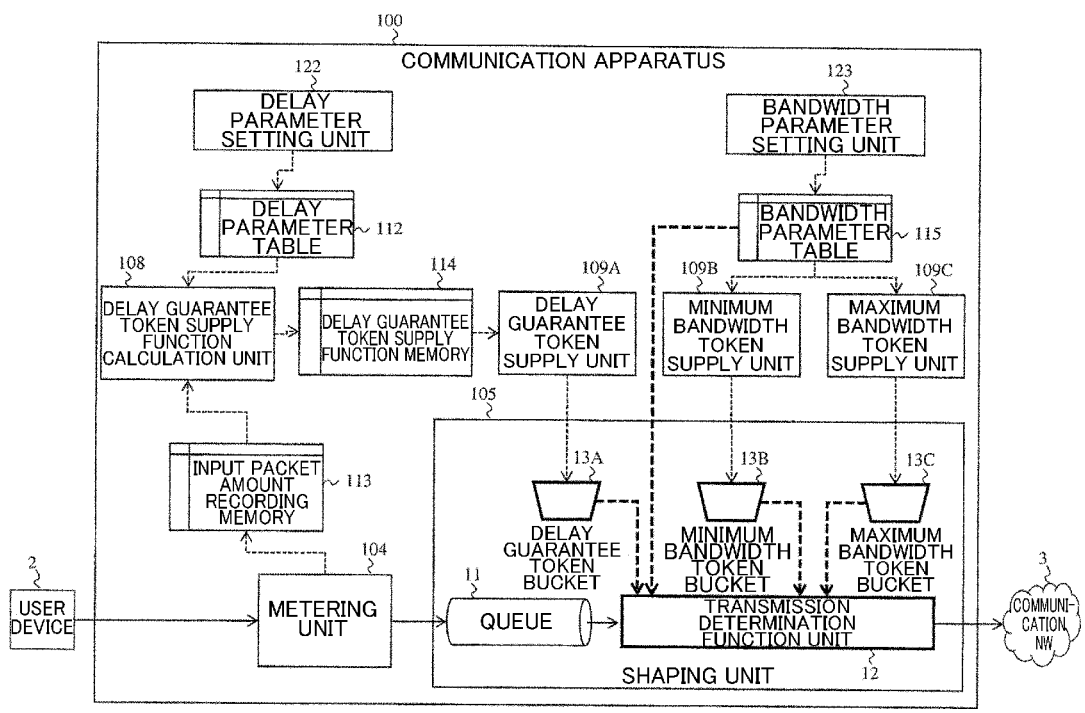
FIG. 2 is a functional block diagram illustrating a communication apparatus according to the present invention.

FIG. 2 is a functional block diagram illustrating a communication apparatus 100 of the present embodiment. The communication apparatus 100 includes: a queue 11 that temporarily holds a packet received from a user device 2; three token buckets of a delay guarantee token bucket 13A, a minimum bandwidth token bucket 13B, and a maximum bandwidth token bucket 13C; a transmission determination function unit 12 that has a token bucket algorithm which transfers a packet held in the queue 11 to a communication network 3 in accordance with tokens held in the three token buckets; a metering unit 104 that measures an amount of packets received from the user device 2 at predetermined intervals; a token supply calculation unit 108 that has a token supply function which specifies an amount of tokens to be supplied to the delay guarantee token bucket 13A and a supply period at the predetermined intervals, generates the token supply function to be added based on the amount of packets measured by the metering unit 104, and adds the token supply function to be added to the previous token supply function; a delay guarantee token supply unit 109A that supplies the delay guarantee token bucket 13A with an amount of tokens corresponding to the token supply function set by the token supply calculation unit 108 at the predetermined intervals; a minimum bandwidth token supply unit 109B that supplies the minimum bandwidth token bucket 13B with an amount of tokens based on a preset minimum bandwidth at the predetermined intervals; and a minimum bandwidth token supply unit 109C that supplies the maximum bandwidth token bucket 13C with an amount of tokens based on a preset maximum bandwidth at the predetermined intervals.

FIG. 3 illustrates a delay parameter table 112 that describes parameters to be used by the token supply calculation unit 108 to calculate the token supply function. An administrator can set the parameters in the table from a delay parameter setting unit 122.

The metering unit 104 measures the amount of packets Bm received from the user device 2 and input to the queue 11 and records the measured amount of packets Bm in an input packet amount recording memory 113. The token supply calculation unit 108 calculates a token supply function based on the contents of the delay parameter setting unit 122 and the input packet amount recording memory 113.

Figure 4:
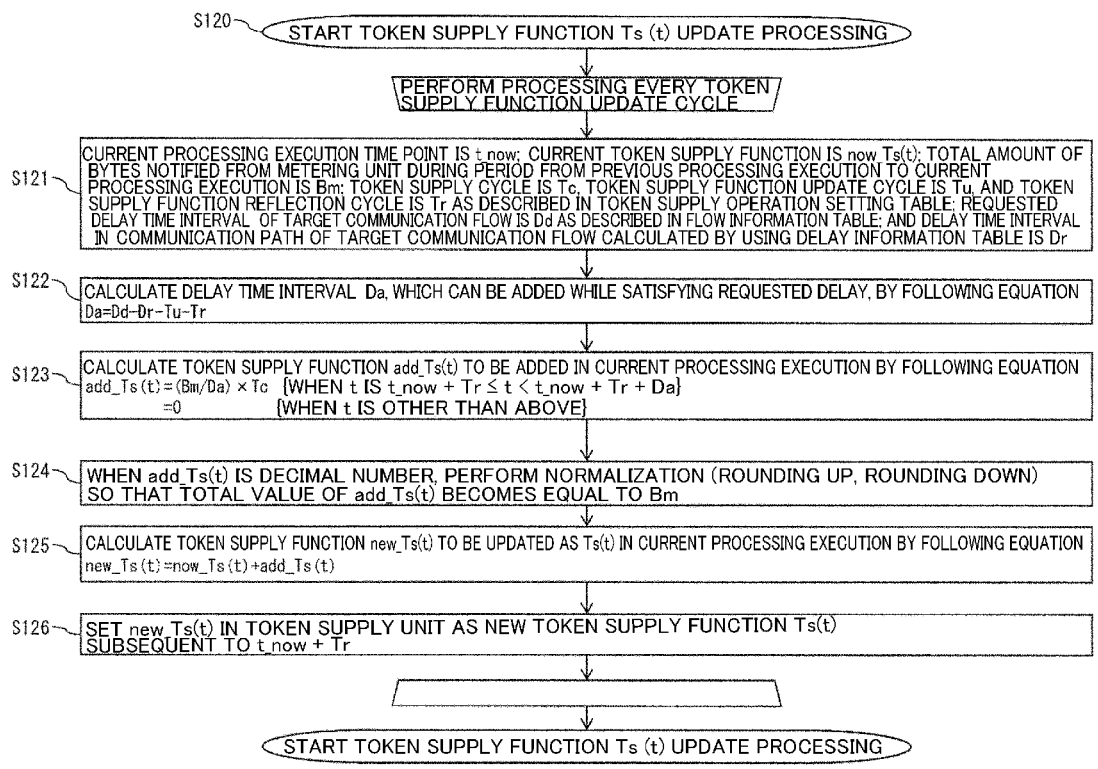
FIG. 4 is a flowchart illustrating token supply function update processing performed by a token supply function calculation unit of the communication apparatus according to the present invention.

FIG. 4 illustrates token supply function Ts(t) update processing (S120) performed by the token supply function calculation unit 108. In the update of the token supply function, when one supply period of tokens calculated based on the input packet amount in one predetermined period overlaps with a subsequent supply period of tokens calculated based on the input packet amount in a predetermined period subsequent to the one predetermined period, the token supply function calculation unit 108 adds the amount of tokens calculated based on the input packet amount in the subsequent predetermined period to the amount of tokens calculated based on the input packet amount in the one predetermined period, during a period in which the one supply period overlaps with the subsequent supply period.

The present update processing is performed every token supply function update cycle set in a token supply operation setting table 111. The current processing execution time point is t_now, and the current token supply function is now_Ts(t). The total amount of bytes notified from the metering unit 104 during a period from the previous processing execution to the current processing execution is Bm. As described in the token supply operation setting table 111, a token supply cycle is Tc, a token supply function update cycle is Tu, and a token supply function reflection cycle is Tr. As described in a flow information table 110, a requested delay time interval of a target communication flow is Dd. A delay time interval in a communication path of the target communication flow calculated by using a delay information table 112 is Dr (step S121).

Da, which is a delay time interval that can be added while satisfying the requested delay, is calculated by the following equation (step S122).

$$Da = Dd - Dr - Tu - Tr$$

A token supply function add_Ts(t) to be added in the current processing execution is calculated by the following equation (step S123).

In a case where $t$ is $t\_now + Tr \leq t < t\_now + Tr + Da$
$$\text{add\_}Ts(t) = (Bm/Da) \times Tc \quad (1)$$

In a case where $t$ is other than the above
$$\text{add\_}Ts(t) = 0 \quad (2)$$

When add_Ts(t) is a decimal number, normalization such as rounding up or rounding down is performed so that the total value of add_Ts(t) is equal to Bm (step S124). The token supply function new_Ts(t) to be updated as Ts(t) in the current processing execution is calculated by the following equation (step S125).

$$\text{new\_Ts}(t) = \text{now\_Ts}(t) + \text{add\_Ts}(t) \qquad 5$$

The calculation in step S125 can be performed by a delay guarantee token supply function memory 114.

As a new Ts(t) subsequent to t=t_now+Tr, new_Ts(t) is set in the token supply unit 109A (step S126). The token supply unit 109A supplies a predetermined amount of tokens to the delay guarantee token bucket 13A at predetermined intervals in accordance with the set Ts(t).

FIG. 5 illustrates a bandwidth parameter table 115 that describes parameters for calculating the amount of tokens to be supplied by each of the minimum bandwidth token supply unit 109B and the maximum bandwidth token supply unit 109C. The administrator can set the parameters in the table from a bandwidth parameter setting unit 123. The minimum bandwidth token supply unit 109B and the maximum bandwidth token supply unit 109C supply tokens to the minimum bandwidth token bucket 13B and the maximum bandwidth token bucket 13C, respectively, based on the descriptions in the bandwidth parameter table 115.

Figure 6:
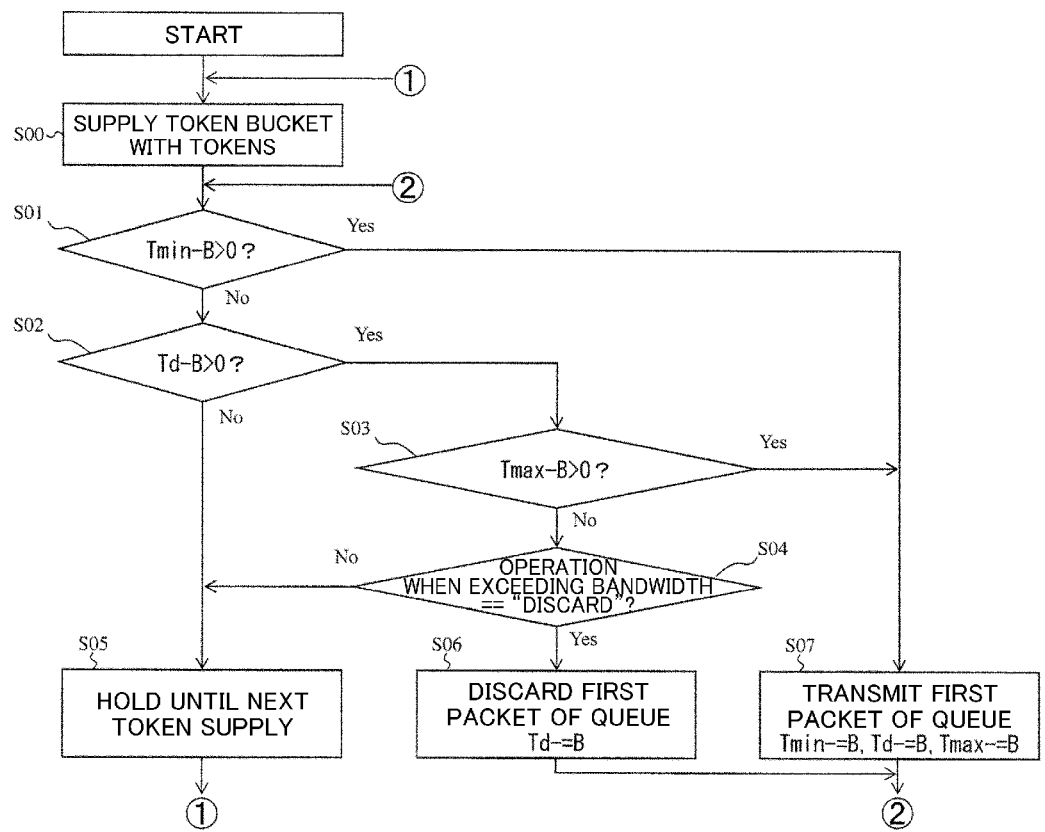
FIG. 6 is a flowchart illustrating a token bucket algorithm performed by the communication apparatus according to the present invention.

FIG. 6 is a flowchart illustrating a token bucket algorithm for determining that the transmission determination function unit 12 transmits, discards, or holds a packet. It is assumed that a total amount of tokens held in the minimum bandwidth token bucket is Tmin, a total amount of tokens held in the maximum bandwidth token bucket is Tmax, a total amount of tokens held in the delay guarantee token bucket is Td, and the packet size of the first packet in the queue is B, at any given time point.

After a token supply time at which tokens are supplied to the three token buckets (step S00), the token bucket algorithm transfers a first packet of the queue 11 to the communication network 3 and subtracts B from each of Tmin, Td, and Tmax (step S07), when Tmin–B is larger than zero ("Yes" in step S01) and when Tmin–B is zero or less ("No" in step S01) and Td–B and Tmax–B are larger than zero ("Yes" in both steps S02 and S03); holds the first packet of the queue 11 on standby in the queue 11 until the next token supply time (step S05) when Tmin–B and Td–B are zero or less ("No" in both steps S01 and S02); and holds the first packet of the queue 11 on standby in the queue 11 until the next token supply time (step S05) or discards the first packet of the queue 11 and subtracts B from Td (step S06) depending on a setting in the bandwidth parameter table 115 in other cases ("No" in step S01, "Yes" in step S02, and "No" in step S03).

The communication apparatus 100 operates as follows in accordance with the algorithm.

(1) In principle, if the delay guarantee token bucket 13A has a token, the first packet of the queue 11 is transmitted to the communication network 3. However, if the maximum bandwidth token bucket 13C has no token at this point, the first packet is not transmitted, but the first packet is held or discarded (in accordance with the setting in the bandwidth parameter table 115).

(2) If the delay guarantee token bucket 13A has no token, the operation to be performed is determined based on the state of the minimum bandwidth token bucket 13B.

(2a) If the minimum bandwidth token bucket 13B has a token, the first packet of the queue 11 is transmitted to the communication network 3.

(2b) If the minimum bandwidth token bucket 13B has no token, the first packet is held or discarded. In this case, if the maximum bandwidth token bucket 13C has a token, the first packet is always held. However, if the maximum bandwidth token bucket 13C has no token, the first packet is held or discarded in accordance with the setting in the bandwidth parameter table 115.

(3) When the first packet has been transmitted, the amount of tokens corresponding to the first packet is subtracted from each of the token buckets. When the first packet has been discarded, the amount of tokens corresponding to the first packet is subtracted only from the delay guarantee token bucket 13A.

(4) The delay guarantee token bucket 13A is periodically supplied with an amount of tokens corresponding to a token supply function calculated by the token supply function calculation unit 108.

(5) The minimum bandwidth token bucket 13B and the maximum bandwidth token bucket 13C are periodically supplied with a fixed amount of tokens irrespective of the amount of packets received from the user device 2.

Hereinafter, specific operations of the communication apparatus 100 will be described.

Example 1

The present example describes a case in which both the minimum bandwidth guarantee and the maximum bandwidth guarantee are provided, and the operation when exceeding is "discard".

Values set in the delay parameter table 112 are as illustrated in FIG. 3.

Figure 7:
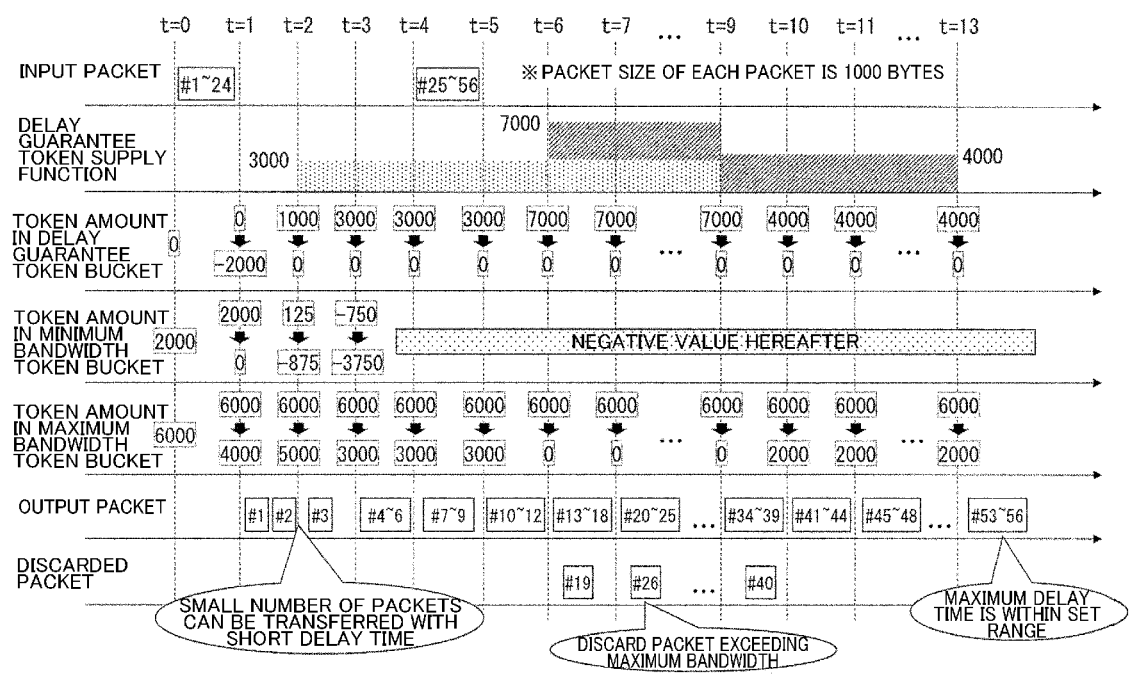
FIG. 7 illustrates an operation example of the communication apparatus according to the present invention.

Values set in the bandwidth parameter table 115 are as illustrated in FIG. 5. In such a case, the communication apparatus 100 operates as illustrated in FIG. 7.

Time Point t=0 to 1

Packets #1 to 24 arrive. The packet size of each packet is 1000 bytes.

Time Point t=1

Since the token supply cycle has been reached, the transmission determination function unit 12 starts the operations in accordance with the algorithm in FIG. 6. First, tokens are supplied. However, assuming that time has elapsed since the last packet transmission, since Tmin and Tmax have reached their maximum values set by the parameters (the minimum bandwidth burst and the maximum bandwidth burst) in the bandwidth parameter table in FIG. 5, no tokens are supplied. Since the token supply function has not been updated, no addition is made to Td.

Since the packet size B of the first packet #1=1000 and Tmin is 2000, Tmin–B>0 holds ("Yes" in step S01). Therefore, the packet #1 is transmitted, and 1000 is subtracted from Tmin, Td, and Tmax (step S07).

Likewise, since the packet size B of the next packet #2=1000, and Tmin is 1000, Tmin–B>0 holds ("Yes" in step S01), the packet is transmitted, and 1000 is subtracted from Tmin, Td, and Tmax (step S07).

As for the next packet #3, since Tmin is 0, Tmin–B>0 does not hold ("No" in step S01), and since Td is −2000, Td–B>0 does not hold, either ("No in step S01). Therefore, the packet transmission ends here (step S05).

In addition, at t=1, since the token supply function update cycle has been reached, the token supply function Ts(t) is updated in accordance with the flowchart in FIG. 4. When calculated with the values set in the delay parameter table 112 in FIG. 3, the token supply function Ts(t) is 3000 during t=2 to 9.

Time Point t=2

Since the token supply cycle has been reached, each token bucket is supplied with tokens.

The minimum bandwidth token bucket 13B is supplied with 125 bytes, which is 1 ms of 1 Mbps, based on the set value in the bandwidth parameter table 112 in FIG. 5.

The maximum bandwidth token bucket 13C is supplied with 6000 bytes, which is 1 ms of 48 Mbps, based on the set value in the bandwidth parameter table 112 in FIG. 5. However, since the maximum value is 6000, Tmax=6000. The delay guarantee token bucket 13A is supplied with 3000 bytes based on the token supply function.

Next, the transmission determination function unit 12 performs the packet transmission determination based on the algorithm in FIG. 6.

While Tmin−B>0 does not hold ("No" in step S01), Td−B>0 and Tmax>0 hold ("Yes" in both steps S02 and S03). Thus, the packet #3 is transmitted, and 1000 is subtracted from Tmin, Td, and Tmax (step S07).

The next packet #4 is not transmitted since neither Tmin−B>0 nor Td−B>0 holds ("No" in both steps S01 and S02).

From this point onward, the consumption amount of tokens is larger than the supply amount of tokens, and Tmin thus continues to have a negative value. After a series of packet transmissions is completed and a period during which packet transmission is not performed elapses for a long time, Tmin takes a positive value, and the token amount recovers to the upper limit of the minimum bandwidth token bucket 13B. By adopting such a mechanism, a small amount of packets with low communication frequency can immediately be transmitted irrespective of the set value.

Time Point t=3

Since the token supply cycle has been reached, each token bucket is supplied with tokens.

As with the case of time point t=2, the minimum bandwidth token bucket 13B is supplied with 125 bytes, which is 1 ms of 1 Mbps, the maximum bandwidth token bucket 13C is supplied with 6000 bytes, which is 1 ms of 48 Mbps, and the delay guarantee token bucket 13A is supplied with 3000 bytes.

Next, the transmission determination function unit 12 performs the packet transmission determination based on the algorithm in FIG. 6.

Td−B>0 holds for the next three packets ("Yes" in step S01), packets #4 to #6 are transmitted.

Time Point t=4 to 5

New packets #25 to 56 arrive at this time. The packet size of each packet is 1000 bytes. However, since Tmin is a negative value at time point t=4, this group of packets is not transmitted but stored in the queue 11. During this time, the transmission determination function unit 12 performs the packet transmission determination as described at time point t=3, and the packets #7 to 12 are transmitted.

Further, since the token supply function update cycle has been reached at t=5, the token supply function Ts(t) is updated in accordance with the flowchart in FIG. 4. When calculated with the new packet amount and the values set in the delay parameter table 112 in FIG. 3, the token supply function Ts(t) is 7000 during t=6 to 9 and 4000 during t=9 to 13.

Time Point t=6

Since the token supply cycle has been reached, each token bucket is supplied with tokens.

As with the case of time point t=2, the minimum bandwidth token bucket 13B is supplied with 125 bytes, which is 1 ms of 1 Mbps, and the maximum bandwidth token bucket 13C is supplied with 6000 bytes, which is 1 ms of 48 Mbps. The delay guarantee token bucket 13A is supplied with 7000 bytes in accordance with the token supply function Ts(t) calculated at time point t=5.

Next, the transmission determination function unit 12 performs the packet transmission determination based on the algorithm in FIG. 6.

The first six packets (#13 to #18) are transmitted in the same manner as described above. The states of the token amounts are Tmax=0 and Td=1000.

Here, the next packet #19 to be transmitted will be described. Since Tmin is a negative value, the determination in step S02 is performed. While Td−B>0 holds ("Yes" in step S02), Tmax−B>0 does not hold ("No" in step S03). Further, since the bandwidth parameter table 115 in FIG. 5 indicates "discard" as the operation when exceeding the bandwidth, the packet is discarded, and 1000 is subtracted from Td (step S06). The reason for subtracting the token amount from Td here is to adjust the value of Td so that the value of Td is always 0 after all the packets are transmitted. Otherwise, the value of Td increases each time the packet is discarded.

Example 2

The present example describes a case in which both the minimum bandwidth guarantee and the maximum bandwidth guarantee are provided, and an operation when exceeding the bandwidth is set "not to discard".

Figure 10:
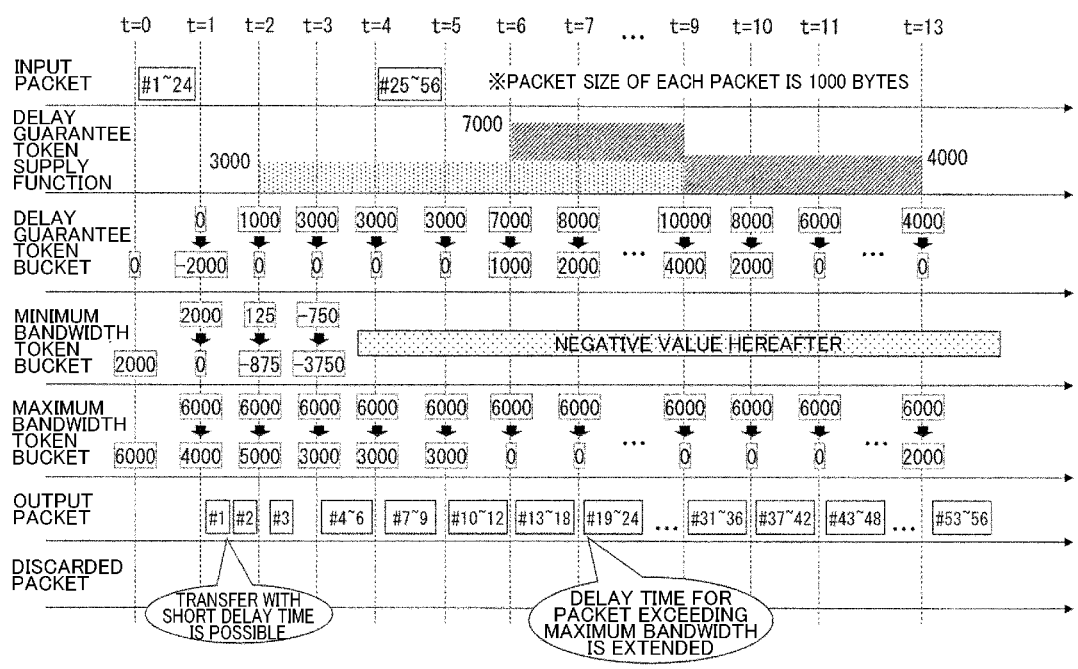
FIG. 10 illustrates an operation example of the communication apparatus according to the present invention.

Values set in the delay parameter table 112 are as illustrated in FIG. 8. Values set in the bandwidth parameter table 115 are as illustrated in FIG. 9. In such a case, a communication apparatus 100 operates as illustrated in FIG. 10. An operation of the communication apparatus 100 differs from that of Example 1 in that a packet is held until the next token supply cycle without discarding the packet. The other operations are the same as those of Example 1.

Example 3

A communication apparatus 100 can also perform the following operation in accordance with settings in the delay parameter table 112 and the bandwidth parameters 115.

Figure 11:
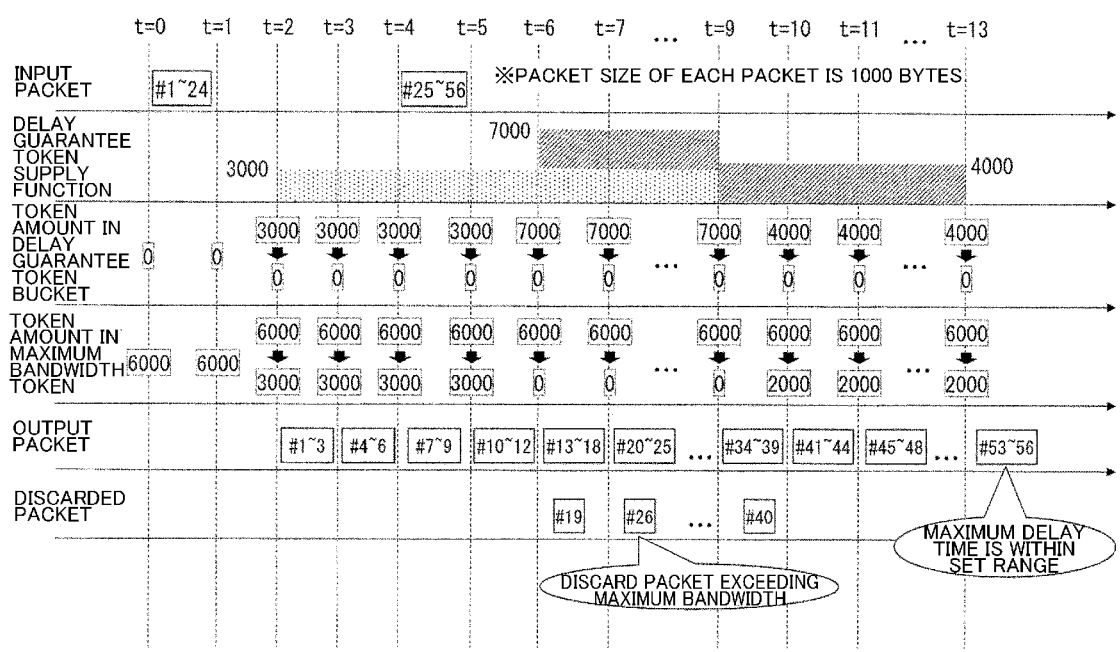
FIG. 11 illustrates an operation example of the communication apparatus according to the present invention.
Figure 17:
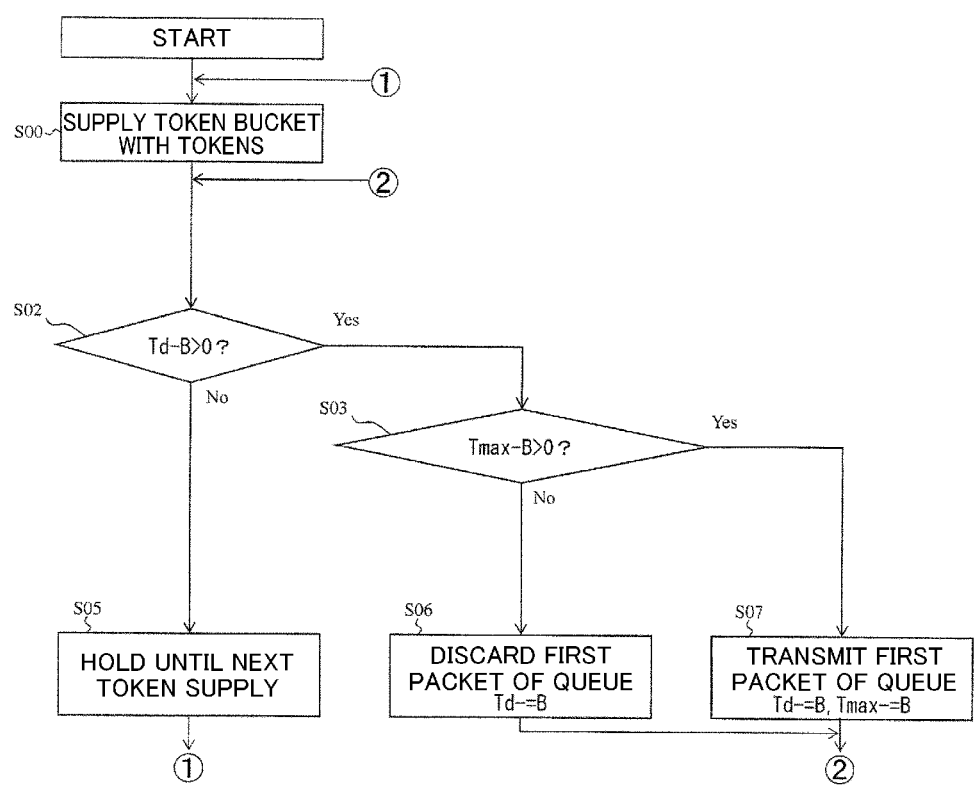
FIG. 17 is a flowchart illustrating a token bucket algorithm performed by the communication apparatus according to the present invention.
Figure 19:
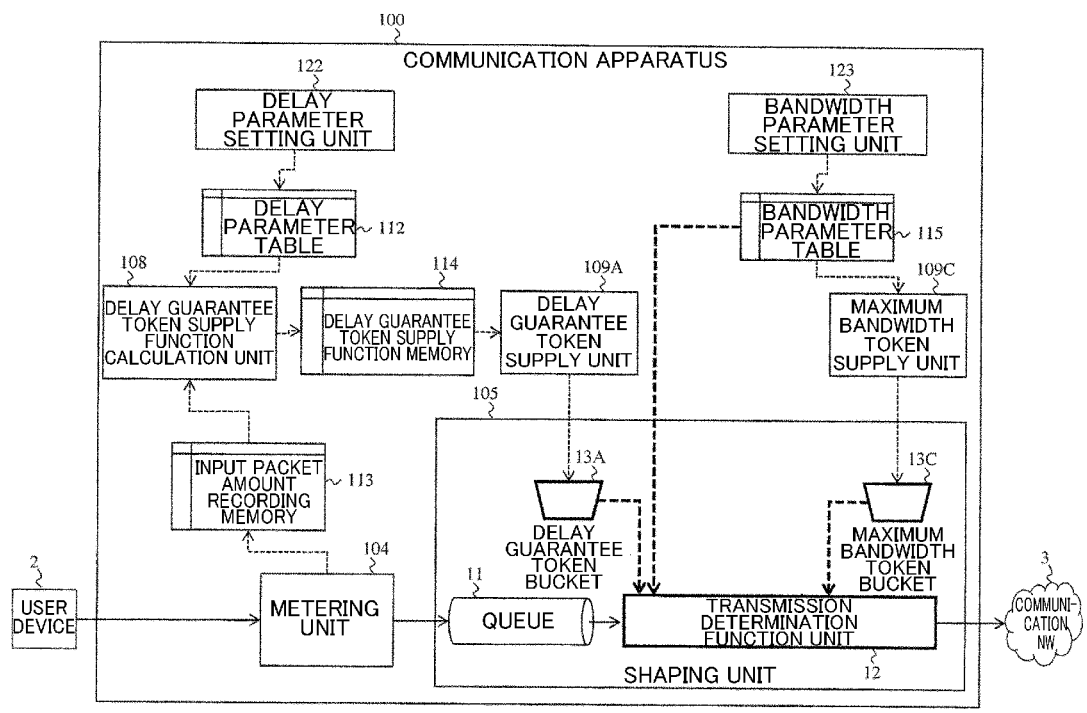
FIG. 19 is a functional block diagram illustrating the communication apparatus according to the present invention.

FIG. 11 illustrates an example in which the delay guarantee and the maximum bandwidth guarantee are provided, and an operation when exceeding the bandwidth is set to "discard". FIG. 19 illustrates an apparatus configuration in this case. In addition, FIG. 17 is a flowchart illustrating operations in this case.

A communication apparatus according to the present example includes: a queue 11 that temporarily holds a packet received from a user device 2; two token buckets of a delay guarantee token bucket 13A and a maximum bandwidth token bucket 13C; a transmission determination function unit 12 that has a token bucket algorithm which transfers a packet held in the queue 11 to a communication network 3 in accordance with tokens held in the two token buckets; a metering unit 104 that measures an amount of packets received from the user device 2 at predetermined intervals; a token supply calculation unit 108 that has a token supply function which specifies an amount of tokens to be supplied to the delay guarantee token bucket 13A and a supply period at the predetermined intervals, generates the token supply function to be added based on the amount of packets measured by the metering unit 104, and adds the token supply function to be added to the previous token supply function; a delay guarantee token supply unit 109A that supplies the delay guarantee token bucket 13A with an amount of tokens corresponding to the token supply function set by the token supply calculation unit 108 at the predetermined intervals; and a maximum bandwidth token supply unit 109C that supplies the maximum bandwidth token bucket 13C with an amount of tokens based on a preset maximum bandwidth at the predetermined intervals.

Assuming that a total amount of tokens held in the maximum bandwidth token bucket is Tmax, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue 11 to the communication network 3 and subtracts B from each of Td and Tmax (step S07), when Td−B and Tmax−B are larger than zero ("Yes" in steps S02 and S03); holds the first packet of the queue 11 on standby in the queue until the next token supply time (step S05), when Td−B is zero or less ("No" in step S02); and discards the first packet of the queue 11 and subtracts B from Td (step S06), when Td−B is larger than zero ("Yes" in step S02) and Tmax−B is zero or less ("No" in step S03).

Example 4

A communication apparatus 100 can also perform the following operation in accordance with settings in the delay parameter table 112 and the bandwidth parameters 115.

Figure 12:
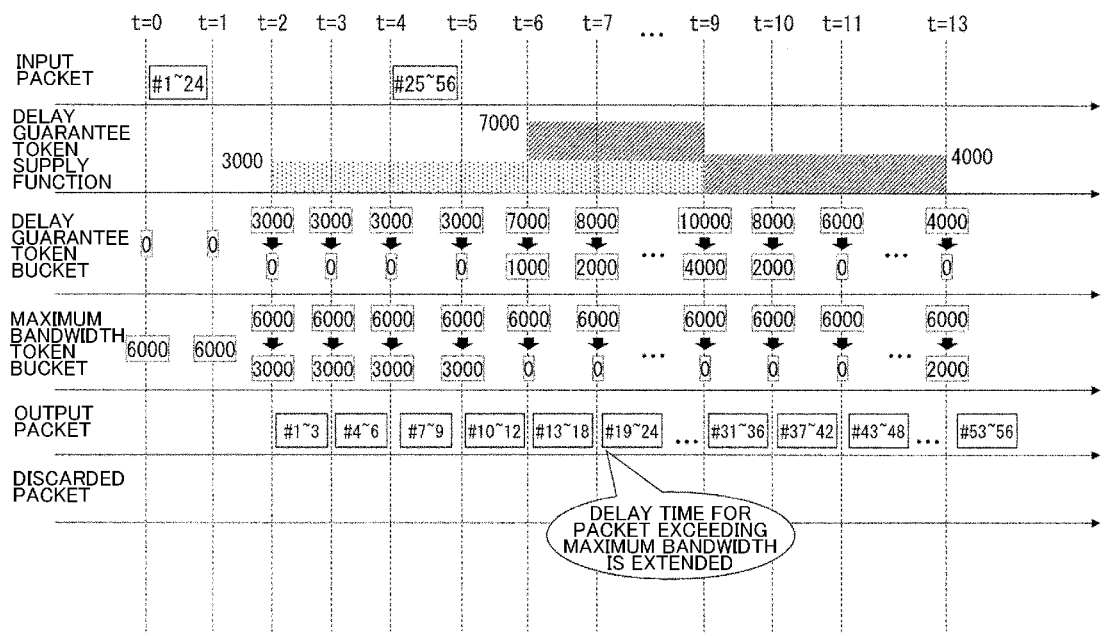
FIG. 12 illustrates an operation example of the communication apparatus according to the present invention.
Figure 16:
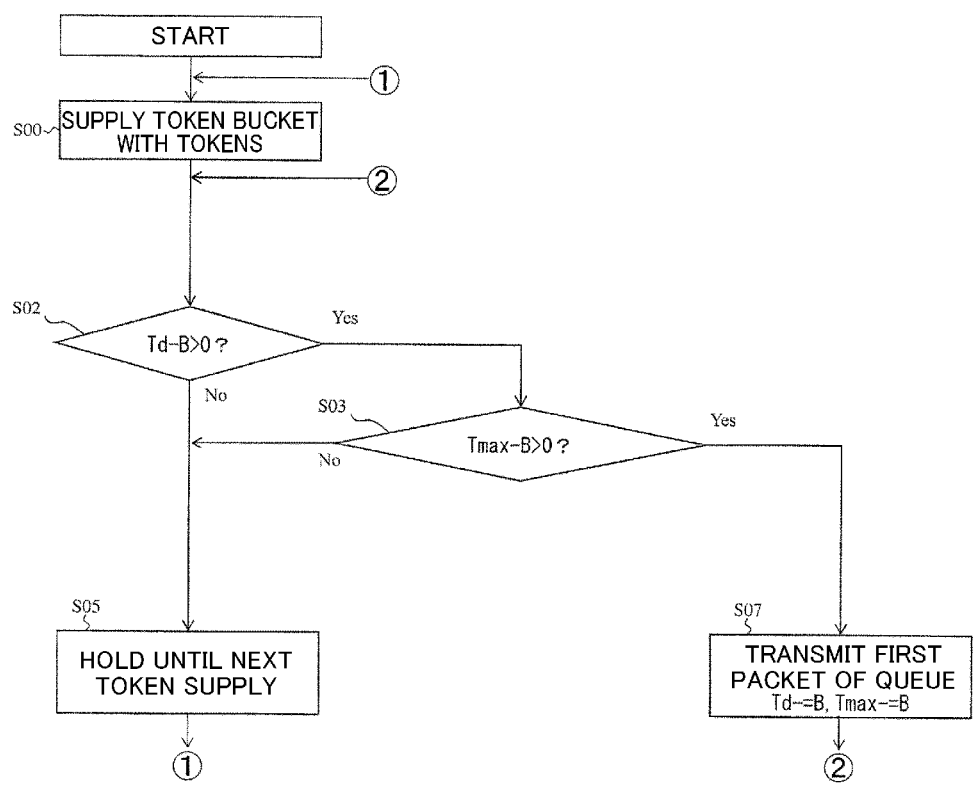
FIG. 16 is a flowchart illustrating a token bucket algorithm performed by the communication apparatus according to the present invention.

FIG. 12 illustrates an example case in which the delay guarantee and the maximum bandwidth guarantee are provided, and an operation when exceeding the bandwidth is set "not to discard". An apparatus configuration in this case is the same as that of Example 3 illustrated in FIG. 19. In addition, FIG. 16 is a flowchart illustrating operations in this case.

Assuming that a total amount of tokens held in the maximum bandwidth token bucket is Tmax, a total amount of tokens held in the delay guarantee token bucket is Td, and a packet size of a first packet in the queue is B at any given time point, after a token supply time at which tokens are supplied to the two token buckets, the token bucket algorithm of the present example transfers the first packet of the queue 11 to the communication network 3 and subtracts B from each of Td and Tmax (step S07), when Td−B and Tmax−B are larger than zero ("Yes" in steps S02 and S03); and holds the first packet of the queue 11 on standby in the queue 11 until the next token supply time (step S05), when Td−B is zero or less ("No" in step S02) or when Td−B is larger than zero ("Yes" in step S02) and Tmax−B is zero or less ("No" in step S03).

Example 5

A communication apparatus 100 can also perform the following operation in accordance with settings in the delay parameter table 112 and the bandwidth parameters 115.

Figure 13:
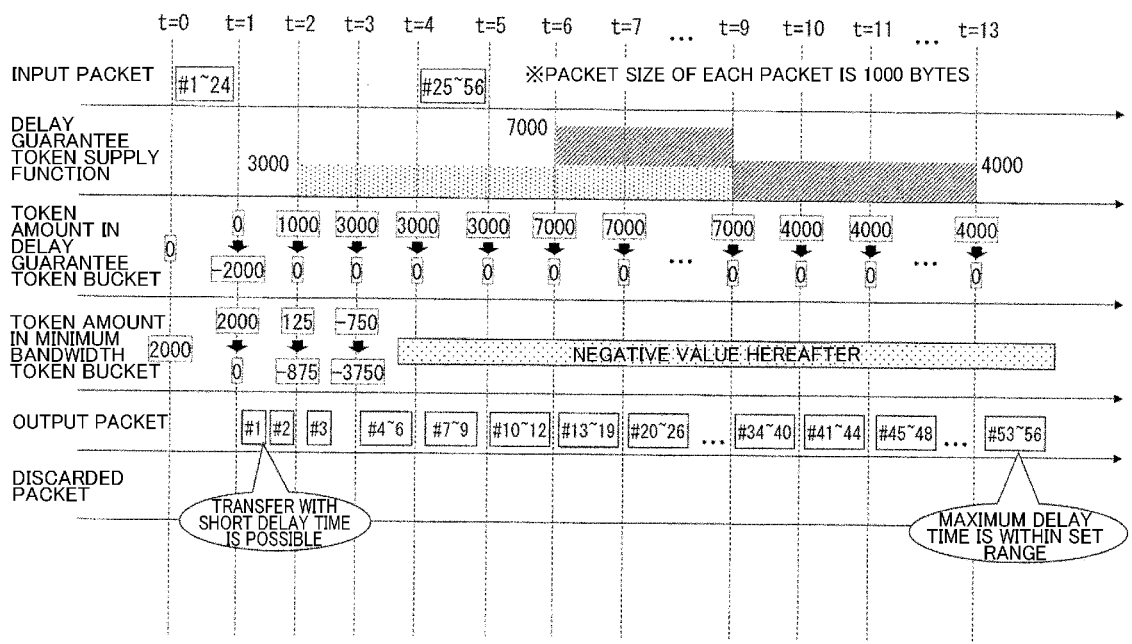
FIG. 13 illustrates an operation example of the communication apparatus according to the present invention.
Figure 15:
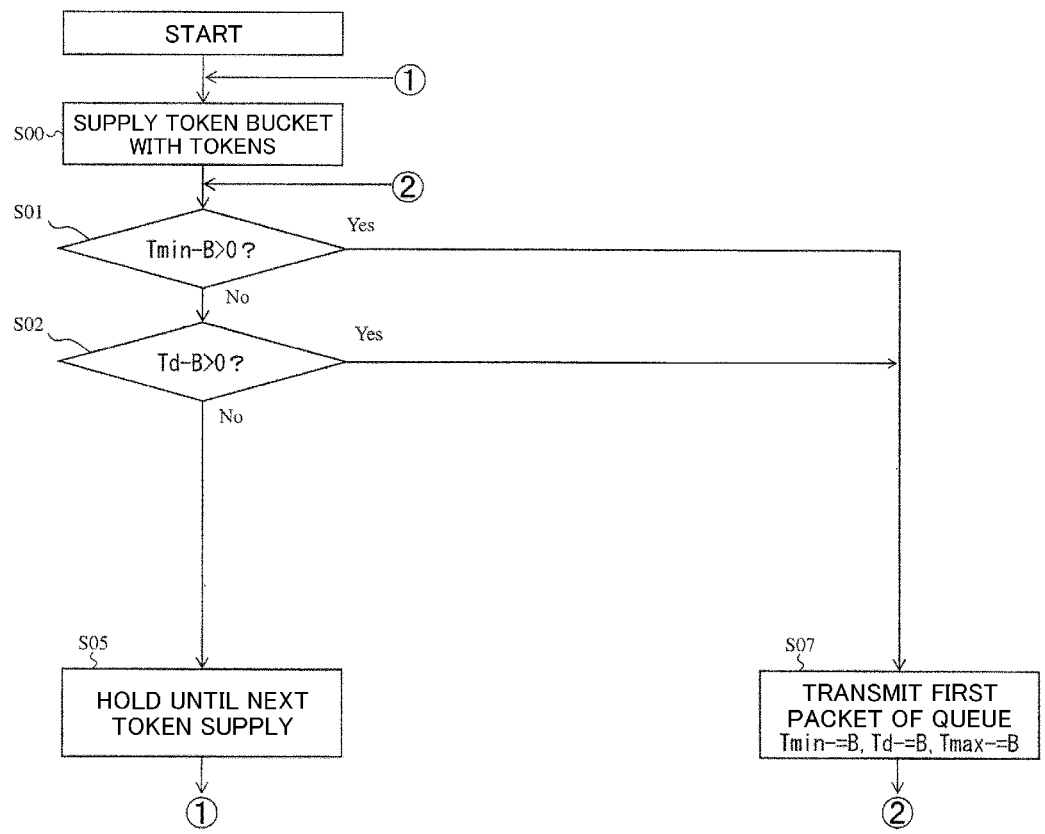
FIG. 15 is a flowchart illustrating a token bucket algorithm performed by the communication apparatus according to the present invention.
Figure 18:
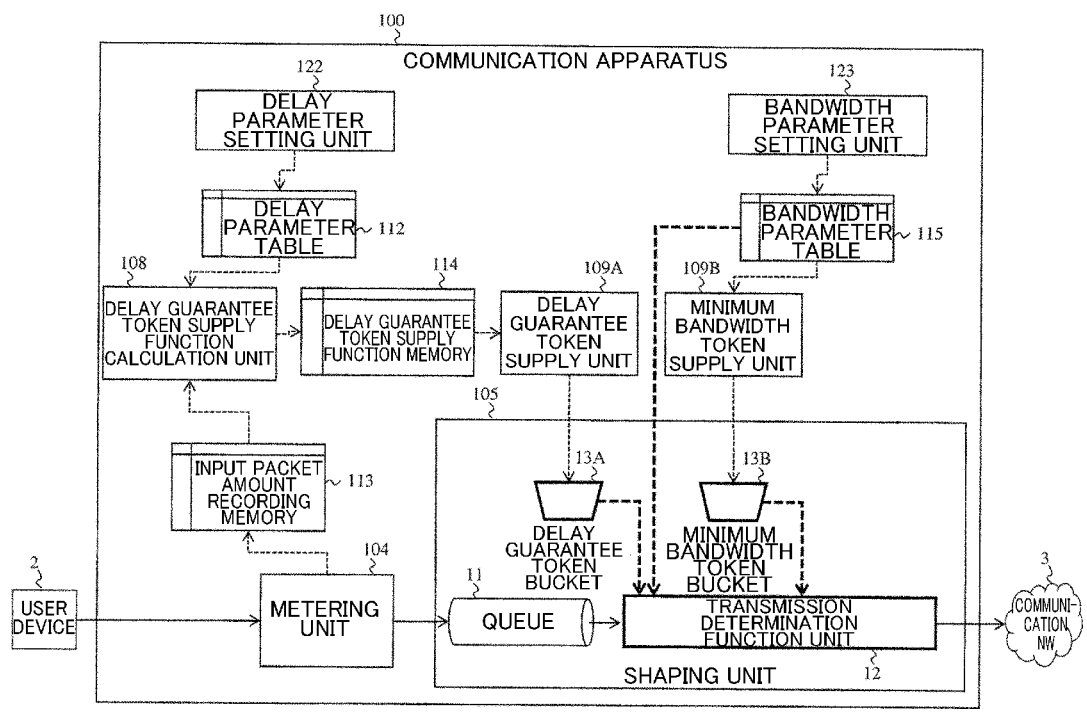
FIG. 18 is a functional block diagram illustrating the communication apparatus according to the present invention.

FIG. 13 illustrates an example case in which the delay guarantee and the minimum bandwidth guarantee are provided. FIG. 18 illustrates an apparatus configuration in this case. In addition, FIG. 15 is a flowchart illustrating operations in this case.

A communication apparatus according to the present example includes: a queue 11 that temporarily holds a packet received from a user device 2; two token buckets of a delay guarantee token bucket 13A and a minimum bandwidth token bucket 13C; a transmission determination function unit 12 that has a token bucket algorithm which transfers a packet held in the queue 11 to a communication network 3 in accordance with tokens held in the two token buckets; a metering unit 104 that measures an amount of packets received from the user device 2 at predetermined intervals; a token supply calculation unit 108 that has a token supply function which specifies an amount of tokens to be supplied to the delay guarantee token bucket 13A and a supply period at the predetermined intervals, generates the token supply function to be added based on the amount of packets measured by the metering unit 104, and adds the token supply function to be added to the previous token supply function; a delay guarantee token supply unit 109A that supplies the delay guarantee token bucket 13A with an amount of tokens corresponding to the token supply function set by the token supply calculation unit 108 at the predetermined intervals; and a minimum bandwidth token supply unit 109B that supplies the minimum bandwidth token bucket 13B with an amount of tokens based on a preset minimum bandwidth at the predetermined intervals.

Assuming that a total amount of tokens held in the minimum bandwidth token bucket is Tmin, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue 11 to the communication network 3 and subtracts B from each of Tmin and Td (step S07), when Tmin−B is larger than zero ("Yes" in step S01) and when Tmin−B is zero or less ("No" in step S01) and Td−B is larger than zero ("Yes" in step S02); and holds the first packet of the queue 11 on standby in the queue 11 until the next token supply time (step S05), when Tmin−B and Td−B are zero or less ("No" in steps S01 and S02).

OTHER EMBODIMENTS

A communication apparatus 100 can also be implemented by a computer and a program, and the program can be recorded on a recording medium or provided through a network.

Figure 14:
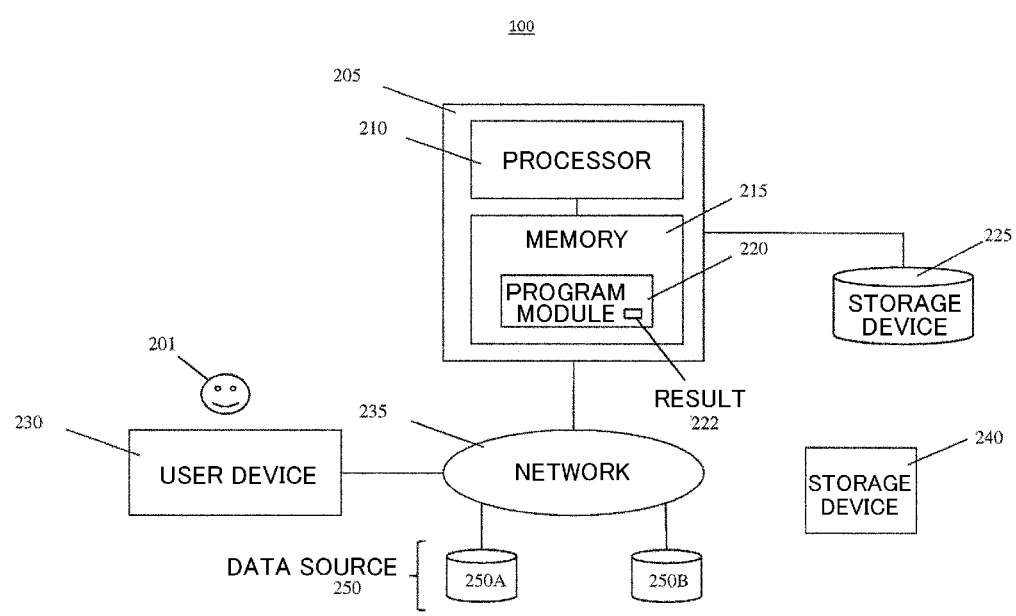
FIG. 14 illustrates an example in which a computer operates as the communication apparatus according to the present invention.

FIG. 14 is a block diagram illustrating the communication apparatus 100. The communication apparatus 100 includes a computer 205 connected to the network 235.

The network 235 is a data communication network. The network 235 may be a private network or a public network and can include any one of or all of (a) a personal area network covering, for example, a certain room, (b) a local area network covering, for example, a certain building, (c) a campus area network covering, for example, a certain campus, (d) a metropolitan area network covering, for example, a certain city, (e) a wide area network covering, for example, an area across metropolitan, regional, or national boundaries, and (f) the Internet. The communication is performed by electronic and optical signals via the network 235.

The computer 205 includes a processor 210 and a memory 215 connected to the processor 210. While the computer 205 is represented as a stand-alone device in the present description, the computer 205 is not limited to this example. Instead, the computer 205 may be connected to other devices (not illustrated) in the distributed processing system.

The processor 210 is an electronic device including logic circuits that respond to and execute instructions.

The memory 215 is a tangible and a readable storage medium for a computer in which a computer program is encoded. In this regard, the memory 215 stores data and instructions readable and executable by the processor 210, namely, program code, to control the operations of the processor 210. The memory 215 can be implemented by a random access memory (RAM), a hard drive, a read-only memory (ROM), or a combination thereof. One of the components of the memory 215 is a program module 220.

The program module 220 includes instructions for controlling the processor 210 to perform processes described in the present description. While the operations are described as being performed by the computer 205, the method, the processes, or the subordinate processes in the present description, those operations are actually performed by the processor 210.

The term "module" is used in the present description to refer to a functional operation that can be implemented as either a stand-alone component or an integrated configuration including a plurality of subordinate components. Therefore, the program module 220 can be implemented as a single module or as a plurality of modules that operate in cooperation with each other. Further, in the present description, the program module 220 is installed in the memory 215 and thus described as being implemented by software. However, the program module 220 can be implemented by any one of hardware (for example, electronic circuits), firmware, software, or a combination thereof.

While the program module 220 is described as being already loaded in the memory 215, the program module 220 may be located on a storage device 240 so as to be loaded into the memory 215 later. The storage device 240 is a tangible and a readable storage medium for a computer that stores the program module 220. Examples of the storage device 240 include a compact disk, a magnetic tape, a read-only memory, an optical storage medium, a hard drive, a memory unit including a plurality of parallel hard drives, and a universal serial bus (USB) flash drive. Alternatively, the storage device 240 may be a random access memory or a different type of electronic storage device that is located in a remote storage system (not illustrated) and connected to the computer 205 via the network 235.

The communication apparatus 100 further includes a data source 250A and a data source 250B that are collectively referred to as a data source 250 in the present description and are communicably connected to the network 235. In practice, the data source 250 includes any number of data sources, namely, one or more data sources. The data source 250 can include unstructured data and can include social media.

The communication apparatus 100 further includes a user device 230 that is operated by a user 201 and connected to the computer 205 via the network 235. The user device 230 includes an input device such as a keyboard or a voice recognition subsystem that enables the user 201 to convey information and command selections to the processor 210. The user device 230 further includes an output device such as a display device, a printer, or a speech synthesizer. A cursor control unit, such as a mouse, trackball, or a touch-sensitive screen, enables the user 201 to operate a cursor on the display device to further convey information and command selections to the processor 210.

The processor 210 outputs a result 222 of an execution of the program module 220 to the user device 230. Alternatively, the processor 210 can provide the output to the storage device 225, such as a database or a memory, or to a remote device (not illustrated) via the network 235.

For example, the program that implements the flowchart in FIG. 4 or 6 may be regarded as the program module 220. The computer 205 can operate as the communication apparatus 100.

Use of the terms "comprise/include . . . " or "comprising/including . . . " shall be taken to specify the presence of stated features, integers, steps, or components but does not preclude the presence of one or more other features, integers, steps, components, or groups thereof. The terms "a" and "an" are indefinite articles and therefore do not exclude embodiments having a plurality.

REFERENCE SIGNS LIST

2 User device
3 Communication network
11 Queue
12 Transmission determination function unit
13A Delay guarantee token bucket
13B Minimum bandwidth token bucket
13C Maximum bandwidth token bucket
104 Metering unit
105 Shaping unit
108 Token supply function calculation unit
109A Delay guarantee token supply unit
109B Minimum bandwidth token supply unit
109C Maximum bandwidth token supply unit
112 Delay parameter table
113 Input packet amount recording memory
114 Delay guarantee token supply function memory
115 Bandwidth parameter table
122 Delay parameter setting unit
123 Bandwidth parameter setting unit
200 System
201 User
205 Computer
210 Processor
215 Memory
220 Program module
222 Result
225 Storage device
230 User device
235 Network
240 Storage device
250 Data source

The invention claimed is:

1. A communication apparatus comprising:
a queue that temporarily holds a packet received from a user device and two token buckets of a delay guarantee token bucket and a minimum bandwidth token bucket;
a processor; and
a storage medium having computer program instructions stored thereon, when executed by the processor, perform to:
a token bucket algorithm which transfers a packet held in the queue to a communication network in accordance with tokens held in the two token buckets;
measures an amount of packets received from the user device at predetermined intervals;
a token supply function which specifies an amount of tokens to be supplied to the delay guarantee token bucket and a supply period at the predetermined intervals, generates the token supply function to be added based on the amount of packets, and adds the token supply function to be added to the previous token supply function;
supplies the delay guarantee token bucket with an amount of tokens corresponding to the token supply function set at the predetermined intervals; and
supplies the minimum bandwidth token bucket with an amount of tokens based on a preset minimum bandwidth at the predetermined intervals, wherein, assuming that a total amount of tokens held in the minimum bandwidth token bucket is Tmin, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue to the communication network and subtracts B from each of Tmin and Td, when Tmin−B is larger than zero and when Tmin−B is zero or less and Td−B is larger than zero; and holds the first packet of the queue on standby in the queue until the next token supply time, when Tmin−B and Td−B are zero or less.

2. A non-transitory computer-readable medium having computer-executable instructions that, upon execution of the instructions by a processor of a computer, cause the computer to function as the communication apparatuses according to claim 1.

3. A communication apparatus comprising:
a queue that temporarily holds a packet received from a user device and two token buckets of a delay guarantee token bucket and a maximum bandwidth token bucket;
a processor; and
a storage medium having computer program instructions stored thereon, when executed by the processor, perform to:
a token bucket algorithm which transfers a packet held in the queue to a communication network in accordance with tokens held in the two token buckets;
measures an amount of packets received from the user device at predetermined intervals;
a token supply function which specifies an amount of tokens to be supplied to the delay guarantee token bucket and a supply period at the predetermined intervals, generates the token supply function to be added based on the amount of packets, and adds the token supply function to be added to the previous token supply function;
supplies the delay guarantee token bucket with an amount of tokens corresponding to the token supply function set at the predetermined intervals; and
supplies the maximum bandwidth token bucket with an amount of tokens based on a preset maximum bandwidth at the predetermined intervals,
wherein, assuming that a total amount of tokens held in the maximum bandwidth token bucket is Tmax, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue to the communication network and subtracts B from each of Td and Tmax, when Td−B and Tmax−B are larger than zero; and holds the first packet of the queue on standby in the queue until the next token supply time, when Td−B is zero or less or when Td−B is larger than zero and Tmax−B is zero or less.

4. A communication method comprising:
holding a packet received from a user device in a queue temporarily; and
performing processing when a packet held in the queue is transferred to a communication network by using a token bucket algorithm which outputs a packet in accordance with tokens held in two token buckets of a delay guarantee token bucket and a minimum bandwidth token bucket,
wherein the processing includes:
measuring an amount of packets received from the user device at predetermined intervals;
generating a token supply function, which specifies an amount of tokens to be supplied to the delay guarantee token bucket and a supply period at the predetermined intervals, by generating the token supply function to be added based on the measured amount of packets and adding the token supply function to be added to the previous token supply function;
supplying the delay guarantee token bucket with an amount of tokens corresponding to the generated token supply function at the predetermined intervals; and
supplying the minimum bandwidth token bucket with an amount of tokens based on a preset minimum bandwidth at the predetermined intervals, and
wherein, assuming that a total amount of tokens held in the minimum bandwidth token bucket is Tmin, a total amount of tokens held in the delay guarantee token bucket is Td, and a packet size of a first packet in the queue is B at any given time point, after a token supply time at which tokens are supplied to the two token buckets, the token bucket algorithm transfers the first packet of the queue to the communication network and subtracts B from each of Tmin and Td, when Tmin−B is larger than zero and when Tmin−B is zero or less and Td−B is larger than zero; and holds the first packet of the queue on standby in the queue until the next token supply time, when Tmin−B and Td−B are zero or less.

* * * * *